Oct. 9, 1956   E. L. CLARKE ET AL   2,765,723
FLEXIBLE HITCH FOR REAR MOUNTED IMPLEMENTS
Filed May 10, 1954   3 Sheets-Sheet 1

INVENTOR.
EVANS L. CLARKE
BY WAYNE A. DOWNEY
Emerson B. Donnell
ATTORNEY

Oct. 9, 1956 — E. L. CLARKE ET AL — 2,765,723
FLEXIBLE HITCH FOR REAR MOUNTED IMPLEMENTS
Filed May 10, 1954 — 3 Sheets-Sheet 2
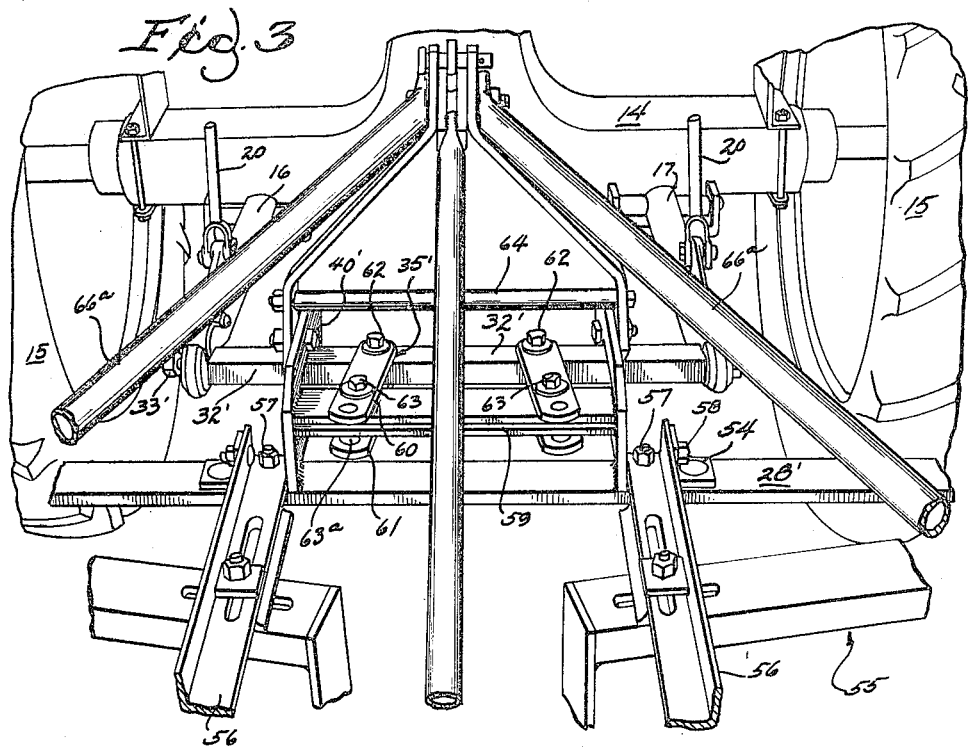
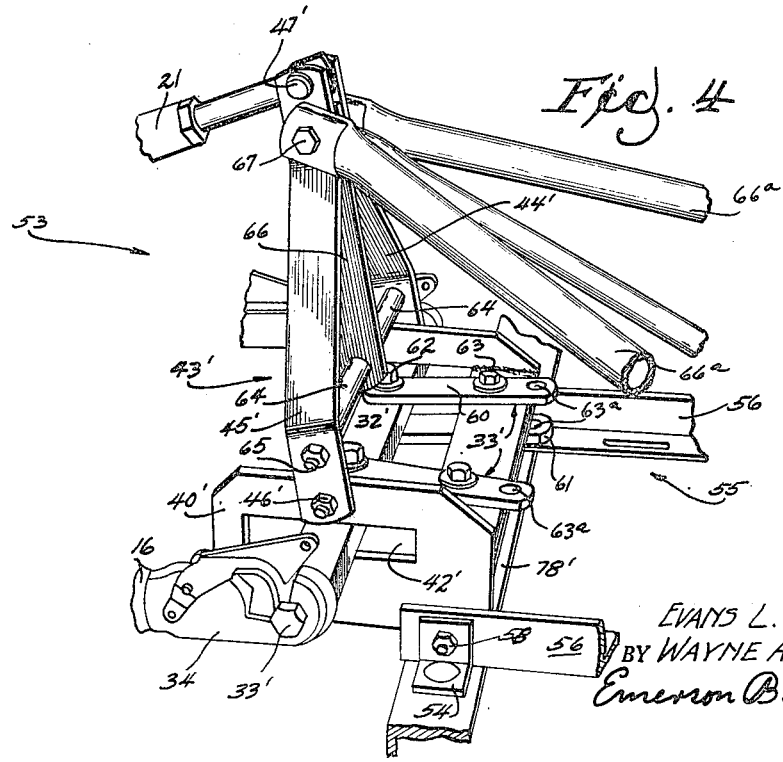
INVENTOR.
EVANS L. CLARKE
BY WAYNE A. DOWNEY
Emerson B. Donnell
ATTORNEY

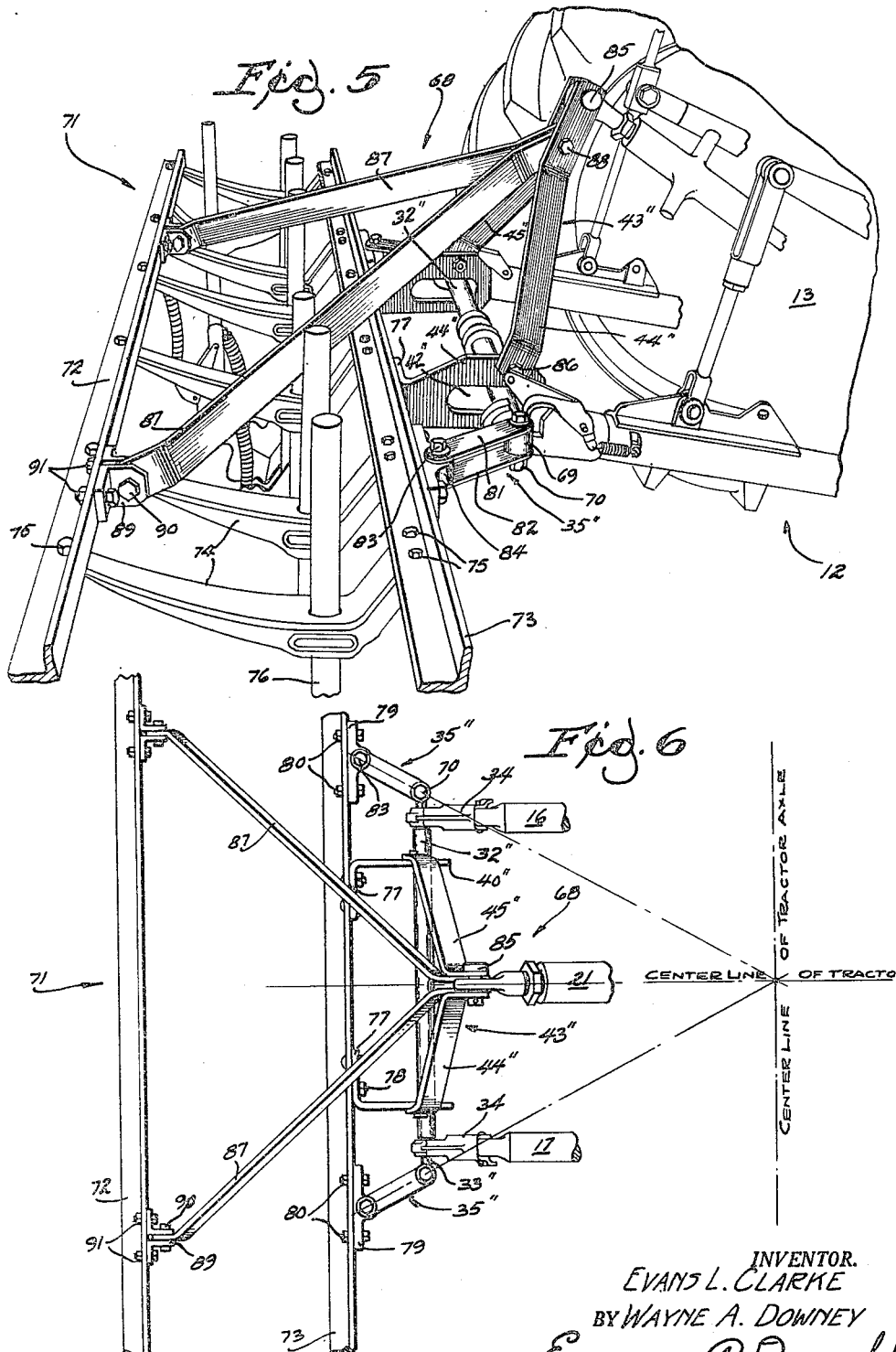

United States Patent Office 2,765,723
Patented Oct. 9, 1956

2,765,723

FLEXIBLE HITCH FOR REAR MOUNTED IMPLEMENTS

Evans L. Clarke, Milan, and Wayne A. Downey, East Moline, Ill., assignors to J. I. Case Company, Racine, Wis., a corporation of Wisconsin Application May 10, 1954, Serial No. 428,682

8 Claims. (Cl. 97—47.65)

The present invention relates to hitches and more particularly to an interconnecting hitch for connecting a lift-type implement to the draft and lifting linkage of a tractor.

An object of the present invention is to provide an interconnecting hitch for connecting a lift type implement to the draft and lifting linkage of a tractor whereby side-to-side swinging of the implement behind the tractor independently of the draft and lifting linkage is permitted.

A further object of the present invention is to provide an implement incorporating an improved hitch whereby when the implement is mounted in combination with the tractor, the latter being of the type having rearwardly extending draft and lifting arms which are rigid or rigidly held against side-to-side swinging movement relative to the tractor, the hitch is effective for causing side-to-side swinging of the implement relative to the tractor when the combination is being operated on a curve or contour.

Another object of the present invention is to provide an improved hitch, for connecting a tractor-mounted implement to a tractor, which can be economically manufactured, which is formed of relatively few parts, and which functions in a highly improved manner.

Referring to the drawings:

Fig. 3 is a fragmentary rear view of a lift type implement in combination with a tractor, showing a modification of the connecting hitch.

Fig. 4 is a left-rear perspective fragmentary view of the combination shown in Fig. 3, showing the connecting hitch in greater detail.

Fig. 5 is a right-rear perspective fragmentary view of a lift-type implement in combination with a tractor, showing a further modification of the connecting hitch.

And Fig. 6 is a plan view of the structure shown in Fig. 5, and with parts removed, and showing the virtual pivot point substantially on the center line of the rear axle of the tractor.

Figure 1:
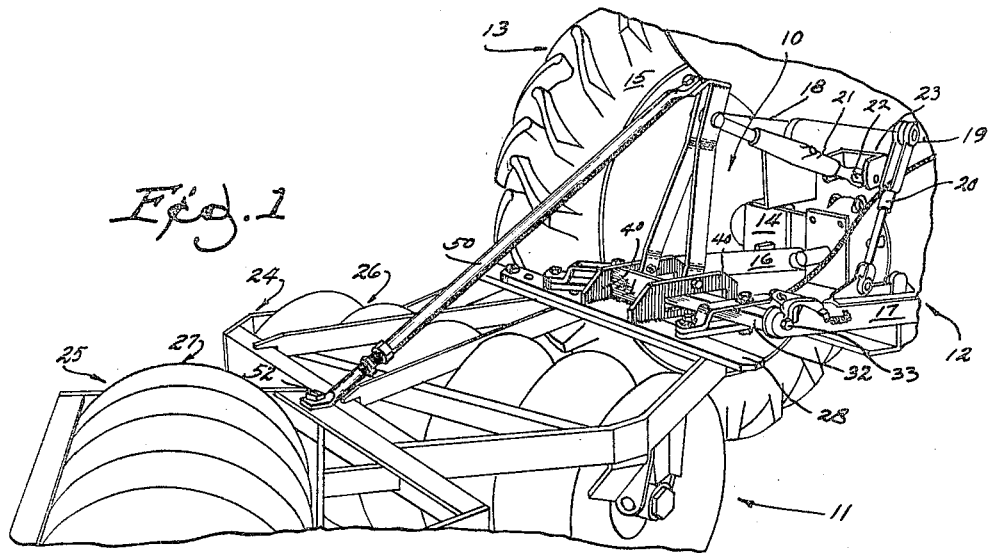
Fig. 1 is a right-rear perspective fragmentary view of a lift-type implement shown in combination with a tractor.
Figure 2:
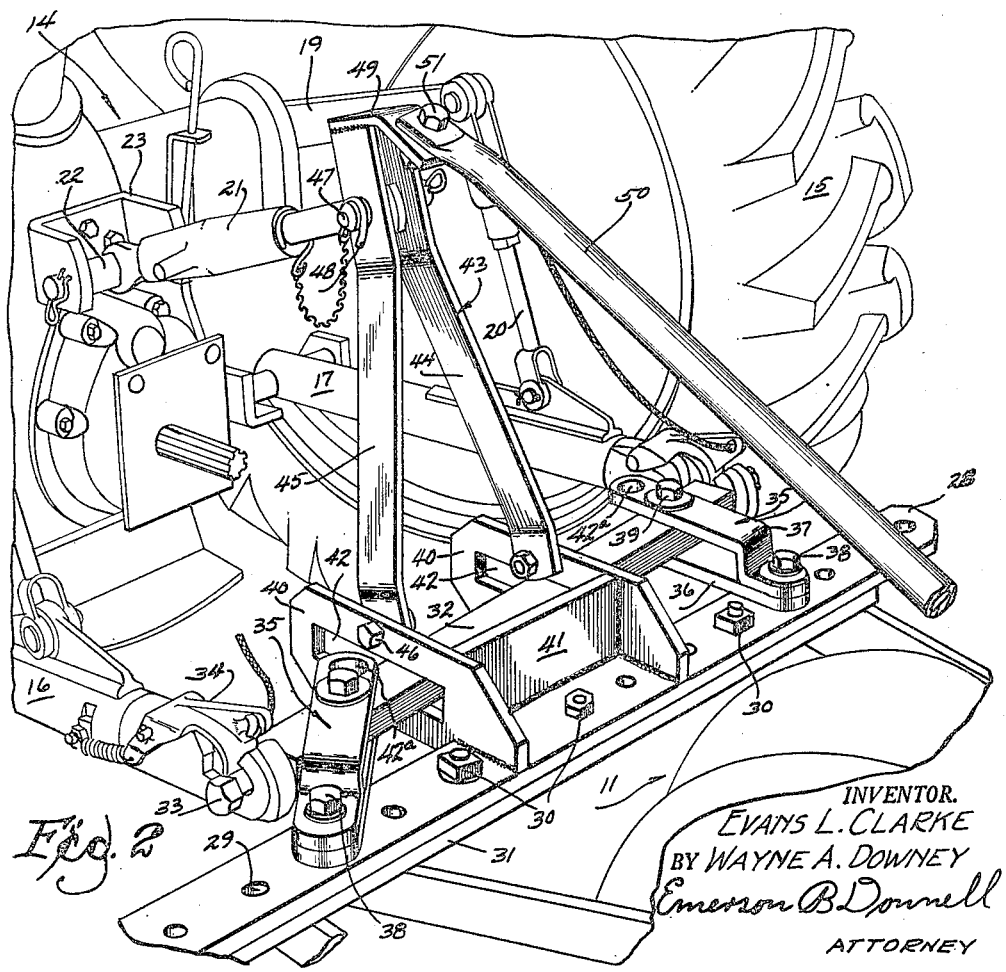
Fig. 2 is a left-rear perspective fragmentary view of the combination shown in Fig. 1, slightly enlarged and in greater detail.

Referring to Figs. 1 and 2 of the drawings, a connecting hitch 10 is illustrative of the present invention and connects a lift type implement designated as number 11 to a draft and lifting linkage 12 of a tractor 13. The tractor, only the rear portion of which is visible, can be of any suitable or well-known construction and has in the present instance the usual rear axle assembly 14 which supports suitable rear traction wheels 15 at its outer ends.

The draft and lifting linkage 12 is of any suitable or well-known construction and is associated with the tractor 13 and comprises in the present instance a pair of rearwardly extending spaced-apart draft arms 16 and 17 which are pivoted adjacent their forward ends for up-and-down swinging movement at their rearward ends. A pair of rearwardly extending power-responsive lift arms 18 and 19 are carried by the axle assembly 14 and are positioned above the draft arms 16 and 17, and suitable links 20 are interconnected between each of the lift arms 18 and 19 and the draft arms 16 and 17 for swinging the draft arms upwardly in response to upward swinging of the lift arms, 18 and 19, under the complete control of the operator from his position on the tractor. Vertically spaced from the draft arms 16 and 17 is positioned a middle link 21 which is swingably supported at its forward end by means of a pin 22 in a suitable bracket 23 which is fixed to the axle assembly 14 of the tractor.

The implement 11, Fig. 1, which in the present instance is an offset disk harrow, comprises a front frame 24 and a rear frame 25 rigidly connected together. Front frame 24 supports a front disk gang 26 and rear frame 25 supports a rear disk gang 27. It will be appreciated that the hitch of the present invention is capable of connecting any lift type implement to a tractor having the required lift arms and other apurtenances.

The connecting hitch 10, Figs. 1 and 2, comprises in the present instance a rigid transverse frame member 28 which has formed therein a plurality of spaced holes 29. The member 28 is secured as by bolts or the like 30 to a front frame member 31 of the implement frame 24. A rigid drawbar 32 has threadedly received in the opposite ends thereof pins 33, and the drawbar 32 is of a length whereby the pins 33 are sufficiently spaced so as to be received in suitable attaching claws 34 carried at the ends of the draft arms 16 and 17 so that drawbar 32 is disposed transversely of the direction of movement of the tractor. The drawbar 32 is connected to the implement 11 by means of a pair of relatively short forwardly converging connecting links 35. Each of the connecting links 35 is formed in the present instance of members 36 and 37, the latter being positioned on top of member 36. Each of the rigid members 36 and 37 are pivotally connected adjacent their rearward ends to the frame member 28 and to the implement front frame member 31 by means of a suitable bolt or the like 38. The member 36 extends forwardly and is positioned adjacent its forward end beneath the drawbar 32. The member 37 also extends forwardly from the implement and is bent sufficiently spaced from member 36 and positioned adjacent its forward end above the member 32. The members 36 and 37 are swingably connected to the drawbar 32 by means of a suitable bolt or the like 39. As previously stated the connecting links 35 are connected between the implement and the drawbar 32 in a forwardly converging relationship, and this relationship is substantially such that the intersection of the longitudinal axes of the links 35 intersect in a virtual pivot located at the intersection of the axis of the rear axle assembly 14 and the for-and-aft centerline of the tractor, as will be more fully explained hereinafter.

A pair of limiting brackets 40 are fixed to the member 28 as by welding or the like in spaced-apart relationship and extend forwardly from the implement 11 and are strengthened by means of a brace 41 which is fixed as by welding to each of the brackets 40 and to the member 28. Each of the brackets 40 has formed therein a fore-and-aft slot 42, which slots are of a size to slidably receive therein the drawbar 32. The links 35 are preferably of a length to permit the drawbar 32 to assume a central position in the slots 42 when the implement is trailing behind the tractor. It will be appreciated therefore that when the implement is being operated on a curve or contour, it can swing to either side of the longitudinal center line of the tractor to the extent permitted by the slots 42. When the implement is swung to one side to its maximum extent, it will move into abutting relationship with respect to the forward end of one of the slots 42 and the rearward end of the other slot. It will also be apparent that the drawing shows the slots 42 as fitting about drawbar 32 closely enough to prevent any substantial side-to-side rocking or "rolling" as between the implement frame, represented by member 31, and the drawbar 32.

It will be noted that each of the members 36 and 37 of the links 35 is provided with an additional bolt receiving opening 42a whereby the operator can increase the effective length of the connecting links 35. It will be appreciated that when the effective lengths of the connecting links 35 are increased, that the drawbar 32 will be shifted closer to the forward ends of the slots 42. With the drawbar in this position, the maximum angled position of the implement with respect to the drawbar will be less than when the drawbar is positioned substantially intermediate the fore-and-aft ends of the slots.

A mast, as in Figs. 1 and 2, generally designated 43, is interconnected between the implement and the middle link 21 to permit raising the implement vertically in response to upward swinging of the draft arms 16 and 17. The mast 43 comprises in the present instance a pair of upwardly extending members 44 and 45 which are secured adjacent their lower ends by means of bolts 46 to each of the forwardly extending brackets 40. The upper ends of the members 44 and 45 are bent sufficiently to receive therebetween the rearward end of the middle link 21, this link 21 being pivotally secured therebetween by means of a suitable connecting pin 47. A cotter pin 48 is provided to secure pin 47 against axial displacement. The fit between the middle link 21 and the pin 47 is sufficiently loose to permit side to side swinging of the implement 11. A rearwardly extending attaching plate 49 is welded to the upper ends of the members 44 and 45 and is connected to one end of a compression link 50 by means of a bolt or the like 51, the other end of the compression link 50 being connected to some convenient part of the rear implement frame 25 by means of a bolt or the like 52. The compression link 50 is preferably of the type which is extensible so that the operator, by lengthening or shortening the link, can cause the rear disk gang 25 to dig deeper or more shallow than the front disk gang 26. The middle link 21 is also preferably of the type which is extensible so that the operator, by either lengthening or shortening link 21, can level the implement when the latter is raised in transport position.

It will be appreciated that the forwardly extending brackets 40 are so positioned with respect to the implement 11 as to receive the drawbar 32 substantially adjacent the center of the length of the drawbar, the interconnecting links 35 being so positioned as to be connected to the drawbar between each of the brackets 40 and the opposite ends of the drawbar.

Referring to Figs. 3 and 4, 53 represents a modified form of a hitch for connecting an implement 55, to a tractor 13, only a portion of which is shown. In this modification, a rigid frame member 28' has fixed thereto in spaced apart relationship a pair of L-shaped brackets 54 and the lift type implement 55, which can be considered as representative of any lift-type implement generally used in combination with a tractor, has a pair of forwardly extending spaced-apart rigid frame members 56 which are secured adjacent their forward ends to the member 28' by means of bolts 57 and to the brackets 54 by means of bolts 58. Forwardly extending limiting brackets 40' are laterally spaced and are welded to the member 28'. A brace 59 is fixed as by welding or the like between the brackets 40' vertically spaced from member 28'. A drawbar 32' has attaching pins 33' threaded into the opposite ends thereof, and pins 33' are arranged to be received in the attaching claws 34 of the draft arms 16 and 17. The implement 55 in the present instance is connected to the drawbar 32' by means of a pair of interconnecting forwardly converging links 35', the links in the present instance being positioned between the brackets 40' and interconnected between the drawbar 32' and the brace 59. Each of the connecting links 35' in the present instance include an upper link 60 and a lower link 61, the brace 59 lying substantially in the horizontal plane of the drawbar 32' when the implement 55 is connected to and horizontally positioned with respect to the tractor. The upper link 60 and the lower link 61 are positioned adjacent the upper and lower surfaces of the drawbar 32' and the brace member 59 and are preferably connected adjacent their forward ends to the drawbar 32' by means of suitable bolts 62 and adjacent their rearward ends to the brace member 59 by means of suitable bolts 63. The links as previously suggested are so connected between the brace member 59 and the drawbar 32' in a forwardly converging relationship, the intersection of the longitudinal axes of the connecting links preferably lying in a plane through the axis of the rear axle assembly of the tractor.

Each of the forwardly extending brackets 40' is also provided with a fore-and-aft extending slot 42' which slidably receives the drawbar 32', the drawbar 32', as viewed in Figs. 3 and 4, being positioned substantially halfway between the fore-and-aft lengths of the slots 42' when the implement is in its trailing position with respect to the tractor. As previously described with respect to the hitch shown in Figs. 1 and 2 brackets 40' and the fore-and-aft extending slots 42' formed in these brackets are effective to prevent swinging of the implement to one side or the other beyond a fixed angular position. The members 60 and 61 have each formed therein adjacent their rearward ends additional bolt receiving opening 63a whereby the effective length of the interconnecting links 35' can be increased for shifting the position of the drawbar 32' with respect to the slots 42' and thereby limit the extent to which the implement is permitted to swing from side to side in a manner similar to that with regard to the hitch shown in Figs. 1 and 2.

A mast 43', Figs. 3 and 4, is connected between the implement 55 and middle link 21. This mast in the present instance consists of a pair of upwardly coverging members 44' and 45' which have swingably connected therebetween as by a pin 47' the rearward end of the middle link 21. The lower ends of the members 44' and 45' are secured to the forwardly extending brackets 40' by bolts or the like 46'. A bolt 65 connects the members 44' and 45' adjacent their lower ends and supports one end of a brace member 66, suitable tubular spacers 64 being carried by the bolt 65 and positioned on opposite sides of the brace 66. A plurality of compression members 66a are connected to the brace member 66 and to the frame members 44' and 45' by means of a suitable bolt 67, and the compression links 66a extend rearwardly therefrom and are connected at their rearward ends to the implement 55 in any suitable manner, the connection of the links 66a to the implement not being shown in the drawings.

Referring to Figs. 5 and 6 of the drawings, 68 designates a hitch which is illustrative of a further modification of the present invention and which is shown as connecting implement 71 to the draft and lifting linkage 12 of the tractor 13. In this modification a drawbar 32", is provided which is substantially cylindrical in cross-section. Attaching pins 33" are threaded into the opposite ends of the drawbar 32" and are arranged to be received in the claws 34 of the draft arms 16 and 17. Each of the pins 33" is provided with a suitable seating portion 69 which is laterally spaced from the respective end of the drawbar and which is suitably apertured for receiving therein a bolt 70.

The implement 71, a portion of which is shown, is illustrative of a tool carrier of a suitable construction. This implement is merely illustrative of a lift-type implement capable of being used in combination with the hitch of the present invention and includes a pair of transverse, equally spaced frame members 72 and 73 which are rigidly connected by means of a plurality of tool carrying brackets 74, the brackets 74 being connected to each of the frame members 72 and 73 by bolts or the like 75. Each of the tool brackets 74 supports therein a cultivating or other ground working tool 76.

A pair of forwardly extending brackets 40″, each of which is formed with an inwardly-extending bent portion 77 adjacent its rearward end, are rigidly secured to the frame member 73, by bolts or the like 78 so that the brackets 40″ are positioned in spaced-apart forwardly extending relationship. Spaced laterally of each of the brackets 40″ is provided a suitable bracket 79, which is fixed by bolts 80 to the frame 73. Forwardly converging connecting links 35″ are connected between the attaching pins 33″ and the brackets 79. Each of these connecting links 35″ comprises link members 81 and 82. The link members 81 and 82 of each of the connecting links 35″ are positioned adjacent the opposite ends of the seating portions 69 and are pivotally secured thereto adjacent the forward ends thereof as by bolts 70. The rearward ends of the link members 81 and 82 of each of the links 35″ are pivotally connected by bolts 83 to the opposite ends of seating portions 84 formed on each of the brackets 79.

A mast 43″ in the present instance consists of a pair of upwardly converging members 44″ and 45″. These members 44″ and 45″ are suitably bent at the upper ends thereof so as to receive therebetween the middle link 21 of the draft and lifting linkage 21. A pin 85 is provided for securing the middle link 21 and the mast 43″ together in a well-known manner. The members 44″ and 45″ are secured adjacent their lower ends by bolts or the like 86 to the brackets 40″. A pair of forwardly converging compression links 87 are received forwardly between the members 44″ and 45″ adjacent pin 85 and are secured therebetween by means of a bolt 88. Rearwardly the compression links 87 are spaced-apart and secured in forwardly extending angle brackets 89 as by bolts 90, the angle brackets 89 being rigidly fixed to the frame member 72 of the implement by bolts 91.

Each of the brackets 40″ have fore-and-aft extending slot 42″ which slidably receives therein the drawbar 32″ thus providing a stop to limit side to side swinging behind the tractor in the same manner as described in connection with the hitch shown in Figs. 1 and 2 and the modification shown in Figs. 3 and 4. It will be appreciated that in this modification, the connecting links 35″ are connected between the attaching pins 33″ and the implement, whereas in the hitch shown in Figs. 1 and 2, the interconnecting links 35 are attached to the drawbar 32 between the attaching pins 33 and the forwardly extending brackets 40, and whereas, in the hitch shown in Figs. 3 and 4, the interconnecting links 35′ are connected to the drawbar 32′ between the forwardly extending brackets 40′.

As previously suggested with respect to the first described embodiment, the connecting links are connected between the implement and the drawbar so that the axes thereof intersect at a point which lies in a plane which is substantially normal to the horizontal and which extends substantially through the axis of the rear axle of the tractor. It will be appreciated therefore that the implement is caused to swing about an axis which is remote from its connection with the draft and lifting linkage of the tractor, the extent to which the connecting links are caused to converge forwardly being best determined by experiment giving due consideration to the type of implement being used in combination with the tractor and whether true tracking of the implement behind the tractor is desirable and necessary. It will also be appreciated that as the implement is caused to swing to one side or the other from the center line of the tractor, that the intersection of the axes of the interconnecting links will be caused to move, in the plane of the axis of the rear axle of the tractor, to one side of the center line of the tractor opposite to that moved by the implement. In other words, if the implement is caused to swing to the left as viewed in Fig. 6, the intersection of the axes of the interconnecting links will be caused to move to the right of the center line of the tractor.

Various modes of carrying out the invention may be employed within the scope of the accompanying claims, which particularly point out and distinctly set forth the subject matter regarded as the invention.

We claim:

1. A hitch, for a tractor having a pair of vertically swingable draft arms and a vertically swingable middle link above said arms, for connecting said tractor to a lift type implement, said implement being provided with a transverse member, in combination, a transverse drawbar extending between and supported by said draft arms, forwardly converging spaced links having their extremities pivotally secured to said transverse member and said drawbar so as to permit said implement to swing transversely, a pair of transversely spaced vertical brackets fixed to said transverse member and provided with apertures freely embracing said drawbar to limit the transverse swinging of said implement, an upwardly extending bifurcated mast pivoted to said brackets, said middle link being pivoted to said mast at a point adjacent the upper extremity of said mast, and a member pivotally extending from said upper extremity rearwardly and downwardly and secured to said implement.

2. A hitch, for a tractor having a pair of vertically swingable draft arms and a vertically swingable middle link above said arms, for connecting said tractor to a lift type implement, said implement being provided with a frame, in combination, a drawbar extending between and supported by said draft arms, forwardly converging spaced links having their extremities pivotally secured to said frame and said drawbar so as to permit said implement to swing transversely, a pair of transversely spaced vertical brackets fixed to said frame and provided with apertures freely embracing said drawbar to limit the extent of transverse swinging of said implement, an upwardly extending bifurcated mast pivoted to said brackets, said middle link being pivoted to said mast at a point adjacent the upper extremity thereof, and a member extending from said upper extremity rearwardly and downwardly and secured to said implement.

3. A hitch, for a tractor having a pair of draft arms and a middle link above said arms for connecting said tractor to a lift type implement, said implement being provided with a frame, in combination, a transverse drawbar, forwardly converging spaced links having their extremities pivotally secured to said frame and said drawbar so as to permit said implement to swing transversely, a pair of brackets fixed to said frame and provided with apertures freely embracing said drawbar to limit the transverse swinging of said implement, and an upwardly extending mast on said frame, said middle link being pivoted to said mast and said mast being rigidly positioned in respect to said frame.

4. A hitch, for a tractor having a pair of vertically swingable arms and a vertically swingable link above said arms, for connecting said tractor to a lift type implement, said implement being provided with a frame, in combination, a transverse drawbar laterally rigid with respect to the tractor, forwardly converging spaced links having their extremities pivotally secured to said frame and said drawbar so as to permit said implement to swing transversely relatively to said tractor, a pair of spaced brackets fixed to said frame and provided with apertures freely embracing said drawbar to limit the transverse swinging of said implement, and a mast rigid with said frame, extending upwardly, and connected with said link.

5. A hitch, for a tractor having a pair of draft arms and a middle link above said arms, for connecting said tractor to a lift type implement, said implement being provided with a frame, in combination, a transverse drawbar, forwardly converging links having their extremities pivotally secured to said frame and said drawbar at spaced points so as to permit said implement to swing transversely, a pair of brackets fixed to said frame and provided with slots freely embracing said drawbar to limit the transverse swinging of said implement and prevent lateral tilting of said implement relatively to said drawbar, and an upstanding mast rigidly mounted on said implement and connecting with the tractor through said middle link.

6. In a tractor hitch, a laterally rigid structure projecting backwardly from the tractor and a link pivoted to the tractor above said structure, an implement spaced backwardly from said structure and having a frame, a pair of links pivoted to the implement frame at points laterally spaced relative to the longitudinal axis of the tractor, said links converging forwardly and being pivoted to said structure at points spaced laterally of the longitudinal axis of the tractor, and an upstanding mast on said implement frame fixed in predetermined position thereto and connected, through said link, to said tractor.

7. A hitch, for a tractor having a pair of laterally rigid draft arms, for connecting said tractor to an implement, said implement being provided with a frame, in combination, a transverse drawbar carried by said draft arms, forwardly converging links having their extremities pivotally secured to said frame and said drawbar so as to permit said implement to swing transversely, an upstanding mast fixed in predetermined position on said frame, and link means pivoted to said mast and to said tractor in a position spaced above said laterally rigid draft arms.

8. A hitch, for a tractor having a laterally rigid draft means, for connecting said tractor to an implement, said implement being provided with a frame, in combination, forwardly converging links having their extremities pivotally secured to said frame and to said draft means at spaced points so as to permit said implement to swing transversely, an upstanding mast adjustably supported on said frame to be fixed thereon in selected positions, and link means pivoted to said mast and to said tractor in a position spaced above said laterally rigid draft arms.

References Cited in the file of this patent
UNITED STATES PATENTS

| | | |
|---|---|---|
| 1,831,997 | Brown | Nov. 17, 1931 |
| 1,988,157 | Bowen | Jan. 15, 1935 |
| 2,341,007 | Wommer | Feb. 8, 1944 |
| 2,616,349 | Lindemen et al. | Nov. 4, 1952 |
| 2,660,938 | Kaupke | Dec. 1, 1953 |